United States Patent [19]

Fellows

[11] Patent Number: 5,413,431
[45] Date of Patent: May 9, 1995

[54] PROTECTIVE COVER FOR A BALL JOINT ASSEMBLY

[75] Inventor: Russell T. Fellows, Mt. Clemens, Mich.

[73] Assignee: TRW Inc., Lyndhurst, Ohio

[21] Appl. No.: 58,417

[22] Filed: May 7, 1993

[51] Int. Cl.⁶ ............................................. B65D 59/00
[52] U.S. Cl. ..................................... 403/12; 403/119; 403/220; 277/212 FB
[58] Field of Search ................... 403/11, 12, 23, 220, 403/134, 119; 277/9, 9.5, 212 FB, 11

[56] References Cited

U.S. PATENT DOCUMENTS

| | | |
|---|---|---|
| 3,199,902 | 8/1965 | Fierstine . |
| 3,598,434 | 8/1971 | Patton et al. . |
| 4,552,480 | 11/1985 | McIntyre . |
| 4,848,950 | 7/1989 | Haberstroh . |
| 5,066,159 | 11/1991 | Urbach . |
| 5,100,254 | 3/1992 | Wasada ............................ 403/134 |
| 5,312,300 | 5/1994 | McGregor et al. .......... 277/212 FB |

*Primary Examiner*—Richard A. Berisch
*Assistant Examiner*—William J. Wicker
*Attorney, Agent, or Firm*—Tarolli, Sundheim & Covell

[57] ABSTRACT

A protective cover for a ball joint assembly includes a plurality of arms. The arms are movable between a retracted position and an extended position in which the arms can be manually grasped to pull the cover off of the ball joint assembly. The cover is one piece and has a side wall with cylindrical sections and an end wall. The arms are mounted on the end wall. When the arms are to be moved from the retracted position to the extended position, the end wall of the cover is pressed against the end of the ball stud to flex the end wall and move the arms from the retracted position to the extended position.

11 Claims, 2 Drawing Sheets

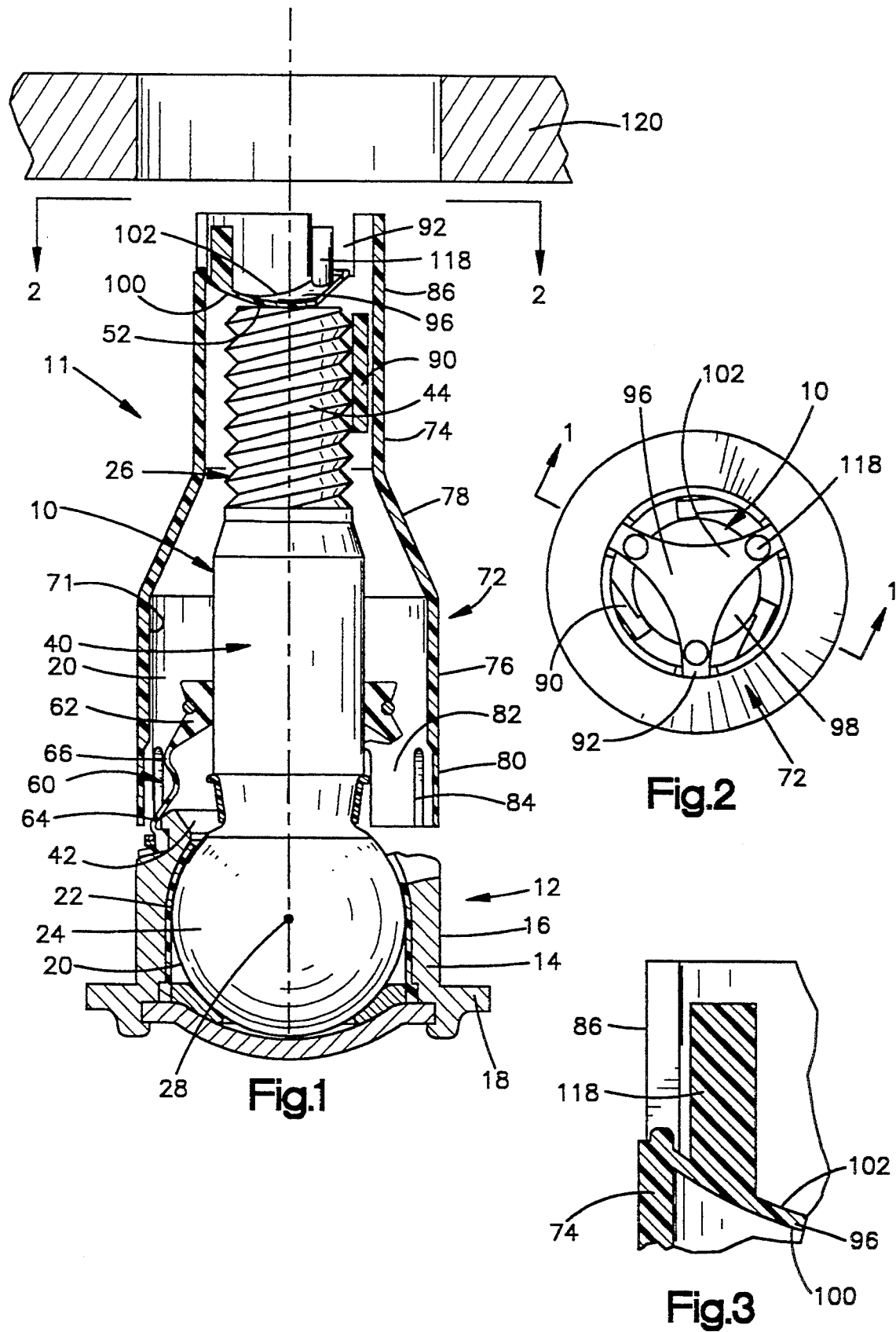

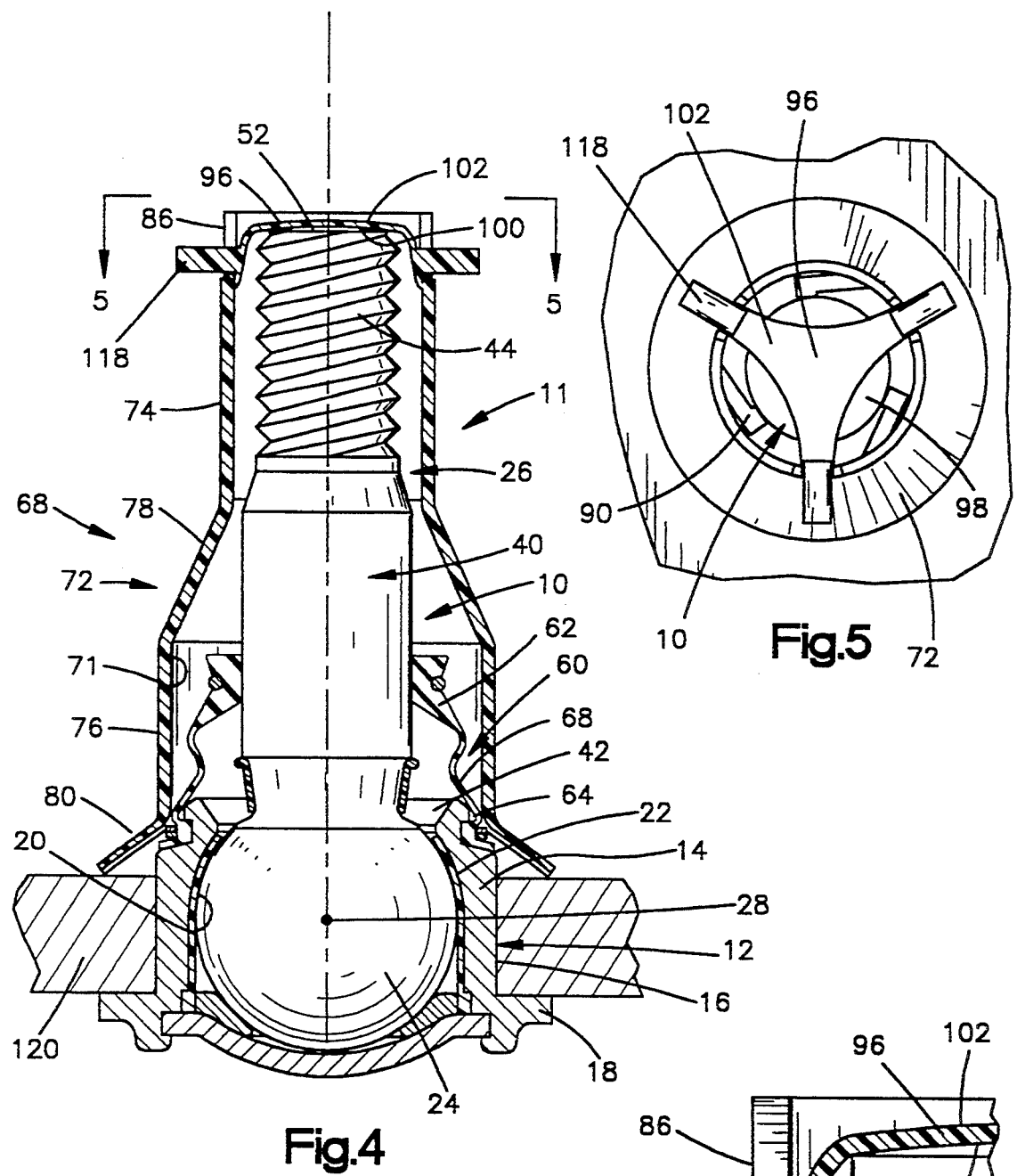
Fig.4
Fig.5
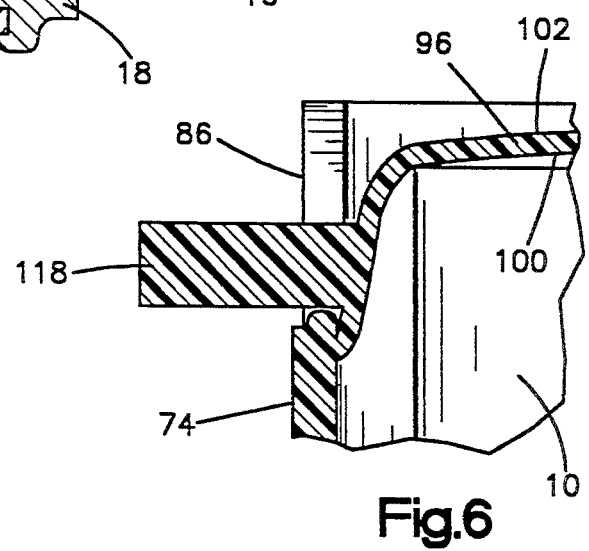
Fig.6

PROTECTIVE COVER FOR A BALL JOINT ASSEMBLY

BACKGROUND OF THE INVENTION

The present invention relates to a protective cover for a ball joint assembly.

Ball joint assemblies are commonly manufactured at one location and shipped to another location for installation in a vehicle. In a typical example a ball joint is assembled into a suspension control arm. The suspension control arm with the ball joint are then moved to a vehicle assembly plant. U.S. Pat. No. 4,848,950 discloses a cover which may be used to protect the ball joint assembly prior to and during assembly into the control arm and during subsequent handling. The cover is removed preferably immediately prior to assembly of the control arm into a vehicle. However, difficulty may be encountered in obtaining a firm grip on the cover to remove it from the ball joint assembly.

SUMMARY OF THE INVENTION

An improved protective cover for a ball joint assembly includes a structure for simplifying removal of the protective cover at the appropriate time. The improved protective cover includes a side wall and end wall which encloses a stud of the ball joint assembly. A plurality of arms are connected with the end wall of the cover. The arms are movable between a retracted position and an extended position. When the arms are in the extended position, they project outward so that they may be manually engaged to facilitate removal of the cover from the ball joint assembly.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view, partially in section, of a ball joint assembly enclosed by a protective cover;

FIG. 2 is an end view taken along lines 2—2 of FIG. 1;

FIG. 3 is an enlarged view of a portion of FIG. 1;

FIG. 4 is a sectional view, similar to FIG. 1, illustrating the ball joint assembly installed in a member;

FIG. 5 is an end view taken along lines 5—5 of FIG. 4; and

FIG. 6 is an enlarged view of a portion of FIG. 4.

DESCRIPTION OF A PREFERRED EMBODIMENT

The present invention relates to a protective cover for a ball joint assembly. The ball joint assembly may be of a variety of constructions. As an example, FIG. 1 illustrates a ball joint assembly 10.

The ball joint assembly 10 is enclosed by a protective cover 11 constructed in accordance with the present invention. The ball joint assembly 10 includes a rigid metal socket 14 (housing) having a generally cylindrical side wall 16 and a mounting flange 18. The socket 14 defines a socket chamber 20 within which is located a bearing 22. The socket 14 is preferably cold formed or screw machined from SAE grade 1008 or 1010 steel which is available from LTV Steel. The bearing 22 comprises two pieces preferably made of injection molded Delrin ® 500CL plastic which is available from E.I. DuPont De Nemours & Co.

The bearing 22 supports a spherical ball portion 24 of a ball stud 26. The bearing 22 supports the ball stud 26 for limited rotation and pivoting movement about a center of oscillation 28. The center of oscillation 28 is coincident with the center of the spherical ball portion 24 of the ball stud 26. The ball stud 26 is preferably cold headed or screw machined and then carbonized. The ball stud 26 is made of SAE grade 8115M or 8615 steel which is available from LTV Steel.

A shank portion 40 of the ball stud 26 projects through a circular opening 42 in the socket 14. A flexible boot seal member 60 seals the opening 42 between the ball stud 26 and the socket 14. The seal member 60 includes a shank seal portion 62 which seals against the shank portion 40 of the ball stud 26 and a socket seal portion 64 which seals against the socket 14. The shank seal portion 62 and the socket seal portion 64 are interconnected by a connector portion 66. The seal member 60 has a passage through which the ball stud shank portion 40 extends. The seal member 60 is formed of a suitable synthetic rubber or polymeric material, such as Compound #1806-85A urethane which is available from Trostel.

The protective cover 11 is one-piece and made of a suitable plastic or other material, preferably polyethylene. The protective cover 11 has a generally cylindrical chamber 71 which receives the shank portion 40 of the ball stud 26 and the seal member 60. The protective cover 11 encloses the shank portion 40 of the ball stud 26 and the seal member 60 to protect them during handling.

The protective cover 11 includes a side wall 72. The side wall 72 has a cylindrical upper end portion 74, (as viewed in FIG. 1) and a somewhat larger diameter cylindrical lower end portion 76. The upper and lower end portions 74 and 76 are interconnected by a frusto-conical intermediate connector section 78.

A generally cylindrical skirt section 80 extends axially downward (as viewed in FIG. 1) from the lower end portion 76 of the side wall 72. The skirt section 80 includes a plurality of segments 82 which are separated by axially extending slots 84. The skirt segments 82 have a radial thickness which is less than the radial thickness of the lower end portion 76 of the side wall 72. The reduced thickness of the skirt segments 82 enables the skirt segments 82 to be easily deflected radially outward by engagement with the flexible material of the seal member 60.

A plurality of retainer elements 90 extend inwardly from the upper portion 74 of the side wall 72 into engagement with a threaded outer end portion 44 of the shank portion 40 of the ball stud 26. The retainer elements 90 hold the protective cover 11 against axial movement relative to the shank portion 40 of the ball stud 26 until an axial force is applied to the cover.

The side wall 72 includes an end portion 86 which is part of the cylindrical upper end portion 74. The end portion 86 has a plurality of slot shaped apertures 92. Each aperture 92 extends vertically and circumferentially through the end portion 86.

The protective cover 11 includes an end wall 96. The side wall 72 is connected with the end wall 96 adjacent to the bottom of the end portion 86 of the side wall 72. The end wall 96 has generally a triangular configuration. The end wall 96 cooperates with the end portion 86 of the side wall 72 at least partially defining a plurality (three) of openings 98. The end wall 96 could have any desired shape which allows the end wall 96 to move (flex axially) relative to the side wall 72.

The end wall 96 has an inner surface 100 and an outer surface 102. Three arms 118 are connected with the outer surface 102 of the end wall 96. The arms 118 extend vertically as shown in FIGS. 1–3 and are spaced approximately 120° apart. The arm 118 are cylindrical and have a length which is slightly less than the height of the end portion 86 of the side wall 72. When the arms 118 are in a retracted position (as shown in FIGS. 1 and 3) the arms are enclosed by the end portion 86 of the side wall 72.

The end wall 96 is movable (flexes axially) relative to the side wall 72 to effect movement of the arms 118 from the retracted vertically extending position of FIGS. 1–3 to an extended horizontally extending position of FIGS. 4–6. The end wall 96 has a concave configuration projecting inward toward the ball stud 26 when the cover 11 and the arms 118 are in the position shown in FIGS. 1–3 and a convex configuration projecting outward from the ball stud 26 when the cover 11 and the arms 118 are in the position shown in FIGS. 4–6. The inner surface 100 of the end wall 96 is engageable with one end of the ball stud 26 to flex the end wall 96 and move the arms 118 from the retracted position to the extended position as the cover is moved downwardly relatively to the ball stud from the position shown in FIG. 1 to the position shown in FIG. 4. The arms 118 extend outward through the apertures 92 in the end portion 86 of the side wall 72 when the arms 118 are in the extended position shown in FIG. 4.

Also, the slots 84 allow the skirt segments 82 to be resiliently deflected outward independently of each other by engagement of the skirt portion 80 with the metal socket 14 as the cover moves downwardly relative to the socket 14 from the position of FIG. 1 to the position of FIG. 4.

The arms 118, when in the retracted position of FIG. 1, extend in an axial direction relative to the circular cross-sectional configuration of the side wall 72. The arms 118 when in the extended position of FIG. 4 extend radially outward of a central axis of the circular cross-sectional configuration of the side wall 72 and radially beyond the upper end portion 74 of the cover 11.

After the ball joint assembly 10 has been fabricated it is aligned with the cylindrical chamber 71 of the protective cover 11. Then the protective cover 11 is telescoped over the shank portion 40 of the ball stud 26 and seal member 60 until the inner surface 100 of the end wall 96 in a convex position contacts a top portion 52 of the threaded outer end portion 44 of the ball stud 26. The protective cover 11 then encloses the shank portion 40 of the ball stud 26 and the seal member 60. The expandable skirt segments 82 engage the seal member 60. The retainer elements 90 of the protective cover 11 engage the threaded outer end portion 44 of the ball joint assembly 10. The ball joint assembly 10 is encircled by the protective cover 11 and is protected from damage during handling and shipping.

The ball joint assembly 10 encircled by the protective cover 11 is then assembled onto a control arm 120 (see FIGS. 1 and 4). The ball joint assembly 10 encircled by the protective cover 11 is aligned with a hole in the control arm 120. The protective cover 11 and the ball joint assembly 10 is then telescoped through the hole in the control arm 120 until the mounting flange 18 of the ball joint assembly 10 abuts the control arm 120. The protective cover 11 is then moved axially toward the control arm 120. As this movement occurs the skirt segments 82 of the protective cover 11 resiliently deflect outward due to engagement with the socket 14 and the control arm 120. Also, as this movement occurs the inner surface 100 of the end wall 96 engages the top portion 44 of the ball stud 26 causing the end wall 96 to flex from the concave position of FIG. 1 to the convex position of FIG. 4. The flexing of the surfaces of the end wall 96 to a convex position moves the arms 118 from the retracted positions (FIGS. 1, 2 and 3) to the extended positions (FIGS. 4, 5 and 6).

After assembly onto the control arm 120 the protective cover 11 on the ball joint assembly 10 protects the seal member 60 of the ball joint assembly even if the ball stud 26 oscillates into full angularity in any direction.

The protective cover 11 is normally removed prior to installation of the control arm 120 into a vehicle. To remove the protective cover 11 from the ball joint assembly 10, the extended arms 118 can be manually grasped to pull the protective cover 11 off the ball joint assembly 10. Manual upward (as viewed in FIG. 4) force is applied to the arms 118 and is transmitted through the side wall 72 to pull the protective covering 11 away from the control arm 120 and ball joint assembly 10. After the protective cover 11 is removed from the assembled ball joint assembly 10, it can be reused. The arms 118 can be moved into their retracted position shown in FIG. 1 by applying manual force to the outer surface 102 of the end wall 96 and pushing the outer surface 102 of end wall 96 inward to the concave position shown in FIG. 1.

Those skilled in the art will appreciate that a protective cover according to the present invention allows for easy protective cover removal, reuse of the protective cover, and prevention of damage to the seal of a ball joint assembly during handling.

From the above description of the invention, those skilled in the art will perceive improvements, changes and modifications. Such improvements, changes and modifications within the skill of the art are intended to be covered by the appended claims.

Having described the invention, the following is claimed:

1. A protective cover for a ball joint assembly having a socket with an outwardly extending ball stud and a seal between the socket and ball stud, said cover comprising:

a side wall and an end wall for enclosing the stud and the seal;

a plurality of arms directly attached to said end wall of said cover;

said arms being movable between a retracted position and an extended position in which said arms extend outward from said side wall; said arms providing means for facilitating removal of said cover from said ball joint assembly when in the extended position.

2. An apparatus as set forth in claim 1 wherein said side wall includes an end portion which extends outward from said end wall, said arms being enclosed by said end portion of said side wall when said arms are in said retracted position, said end portion of said side wall having surfaces defining apertures in said end portion, said arms each extending outward through an aperture in said end portion of said side wall when said arms are in said extended position.

3. An apparatus as set forth in claim 1 wherein said end wall includes surface means defining a plurality of openings in said end wall.

4. An apparatus as set forth in claim 1 wherein said side wall has a cylindrical portion with a longitudinally extending central axis, said arms extending in an axial direction relative to said side wall when said arms are in their retracted positions, said arms extending outward of the central axis of said side wall when said arms are in their extended position.

5. An apparatus as set forth in claim 1 wherein said end wall has an inner side surface and an outer side surface, said arms being connected with said outer side surface of said end wall, said inner side surface of said end wall being engageable with one end of the ball stud to flex said end wall and move said arms from said retracted position to said extended position.

6. An apparatus as set forth in claim 1 wherein said protective cover including side wall, end wall and arms are one piece and wherein said side wall has cylindrical sections of different diameter.

7. An apparatus as set forth in claim 1 wherein said side wall has a skirt portion which is deflectable outward to an expanded condition by engagement with the housing of the ball joint assembly upon application of an axially directed force to said cover.

8. An apparatus as set forth in claim 1 wherein said end wall is movable relative to said side wall to effect movement of said arms from the retracted position to the extended position.

9. An apparatus as set forth in claim 8 wherein said end wall has a concave configuration projecting inward toward the ball stud when said arms are in the retracted position and a convex configuration projecting outward when said arms are in the extended position.

10. Apparatus comprising:
a ball joint assembly having a socket;
a ball stud having a shank portion extending from said socket, and a seal between said shank portion and said socket;
a protective cover comprising a plurality of walls defining a chamber for receiving the shank portion and the seal, and a plurality of arms, each of said arms being mounted on at least one of said walls, said arms being movable between a retracted position and an extended position, said arms when in said extended position having portions which are manually engagable to remove said cover from the ball joint assembly; and
said shank portion and one of said walls forming means for moving said arms from said retracted position into said extended position in response to relative movement of said protective cover and said ball joint assembly.

11. Apparatus as defined in claim 10 wherein said means for moving said arms comprises a flexible end wall of said protective cover to which said arms are attached and an end of said shank portion which engages said flexible end wall and flexes said end wall in response to relative movement of said cover and said ball joint assembly.

* * * * *